Patented Mar. 12, 1940

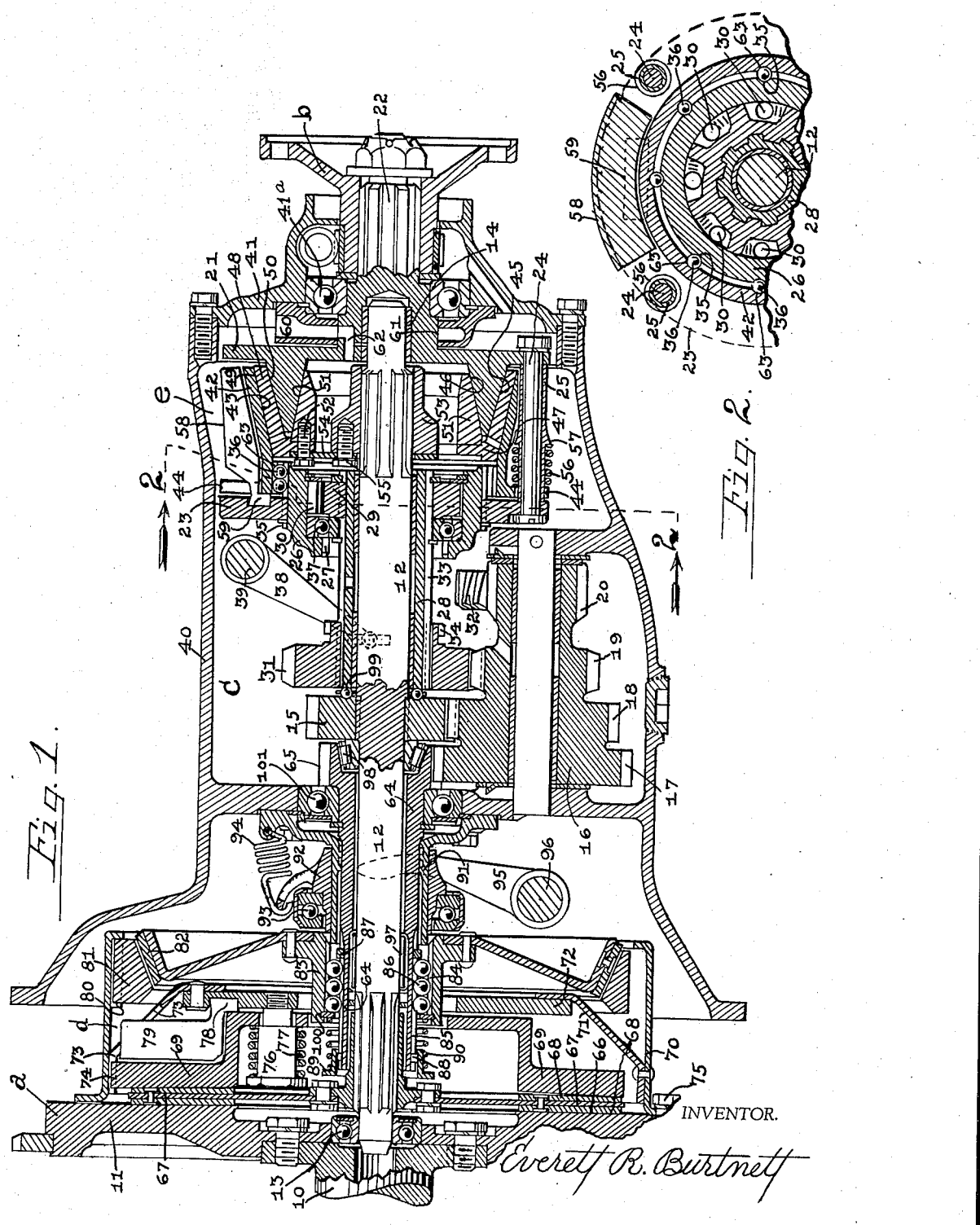

2,193,267

UNITED STATES PATENT OFFICE 2,193,267

TRANSMITTING MECHANISM

Everett R. Burtnett, Los Angeles, Calif., assignor to Automotive Improvement Patents Corporation, Los Angeles, Calif.

Application September 28, 1936, Serial No. 102,885

9 Claims. (Cl. 74—336)

This invention relates to combined automatic and optionally governed change speed power transmitting mechanism, more particularly for use in motor vehicles. More particularly, my invention relates to multi-speed transmitting means between power driven driving and load propelling driven members with centrifugal clutch mechanisms for initially completing the driving connections of a low speed ratio of drive through the multi-speed transmitting unit and for supplantively coupling the driving connections of a faster speed ratio of drive through the multi-speed transmitting unit between the power driven driving and load propelling driven members, and to means whereby the operator may at his option alter the driving speed ratio of either the automatically established low speed ratio of drive or the automatically supplemented higher speed ratio of drive.

A first great drawback in automatically established initial driving and supplantive speed ratios of drive, which advantageously operate accumulatively with respect to stepped speed attainments in the transmission trains, is that such relations require one-way driving connections in the lower speed ratios of drive which are to be supplanted or superimposed by accumulative driving connections of higher supplanting speed ratios of drive, in order that the driven member common to all driving speed ratios may overrun each accumulatively supplanted next-under-speed ratio of drive train thereto. In automotive applications, the one-way driving under-speed ratios operate as a drawback in that they free-wheel in gear and do not provide a positive gearing drive whereby the engine compression braking effort against the vehicle is available "in gear". With such applications it has been the practice in projected automatic transmission developments to provide shiftable gear or jaw clutch devices brought under the optional control of the operator for at least supplanting the automatically established "high" speed ratio of drive with a positive gear drive in which the engine compression braking effort is obtainable at a geared advantage against the momentum of the vehicle. Due to their positive interengageable character, the gear or jaw clutch establishing means of optionally bringing a more effective positive gear ratio connection in the vehicle drive into play imposes, that either the speed of the vehicle be reduced to a point at which the transmission will automatically uncouple to the extent of permitting the optional shift of the positive gear or jaw clutch element, or the provision of clutch means disengageable at the option of the operator whereby the drive is temporarily loosened to permit the shift of gear or jaw clutch parts. Either requirement upon the driver is contrary to safety and ease of vehicle control.

A second great drawback of the automatically accumulatively established stepped up speed ratios of drive, one superimposing another and taking the load therefrom is that the changes between the respective next-in-ratio drives must be effected at predetermined vehicle speed attainments, each not too high, if the transmission is not to revert back to a next-in-ratio lower speed ratio at too high a vehicle speed to be of normal advantage and economy and comfort to the vehicle occupants. The automatic control therefore should be such that it will operate to bring the highest, or touring, speed ratio into play incident to the vehicle attaining a speed not to exceed 25 M. P. H. There rises therefrom the requirement for a means provision whereby the operator may impose his will at his option over the automatic speed changing transmission and cause the same to remain in a higher torque gear ratio of drive, than the top speed ratio, up to a vehicle speed attainment appreciably higher than 25 M. P. H.

Diversifying over means to meet similar requirements, as fully described in my co-pending applications: Serial No. 696,682 filed Nov. 4, 1933; and Serial No. 95,357 filed Aug. 11, 1936, an object of the present invention is to provide a combined automatic and optionally controlled change speed transmission having improved change speed gear-set component forms and arrangements, and improved automatic speed changing clutch mechanisms, and improved optional control means by which the operator causes the transmission to operate at a different speed ratio than automatically established including an alternative positive two-way driving-under-speed ratio-to-the automatically established top speed.

A drawback of centrifugally energized friction clutch engagements, through the progression from initial to positive clutching states, results from mounting of the presser clutch elements by means of sliding relations such as splines or rails. Such provisions tend to promote uneven progressive movement in response to the gradually increasing centrifugal force. That is to say, the high friction coefficient of slide contacts between the presser clutch element and its mounting operates to restrain the presser element from responding to the centrifugal urge applied to it gradually in accordance with the gradually increasing centrifugal influence. The result is a jerky or rough clutch engagement. To overcome this last mentioned drawback, the present invention has for a further object the provision of ball or other roll-free type of bearing in the mounting of the presser clutch element in connection with provisions for centrifugal energizing of presser clutch elements to accomplish automatic clutch engagement. It will be understood that this provision would operate with equal advantage in connection with rendering easier relative movements between an engaging element and its mounting of a friction brake device for drivingly relating power transmitting means to operate at certain speed ratios. Accordingly, the scope of application of this improved frictionally-engaging element mounting means was conceived to include such a diverse use.

Other and important objects of this invention will be apparent from the disclosures in the specification and the accompanying drawing.

This invention (in a preferred form) is illustrated in the drawing and hereinafter more fully described.

On the drawing:

Figure 1 is a vertical longitudinal section through a combined automatic and optional change speed power transmission embodying the features of this invention.

Figure 2 is a fragmentary detail cross section on line 2—2 of Figure 1 showing one form of speed responsive automatic clutch mechanism of the invention and one form of anti-friction longitudinal movement mounting of the presser clutch element feature of the invention.

A form of the present invention is illustrated as an intermediary multi-speed transmission for connecting a driving member, preferably an engine crank shaft 10, to a vehicle propelling member, preferably an axially aligned driven transmission part b. It is characterized particularly, first, by a constituency of variable speed intermediary gearing and shafts, arranged operatively between the aforesaid driving member 10 and driven member b, which includes a low speed ratio provided with an overrunning clutch in series therein such that the driving connections of the low speed may remain mobilized while a higher speed ratio of drive supplantively operates to overrun the low speed drive; secondly, by a constituency of centrifugal automatic and optionally engageable friction clutches related to the variable speed intermediary means such that one centrifugal automatic clutch normally operates to complete the driving connections of the low speed ratio between the driving and driven members, such that a second centrifugal automatic clutch normally operates to establish a higher speed ratio of drive supplantively over the low speed ratio of drive between the driving and driven members, and such that the optional clutch will operate to open one of the centrifugal automatic clutches and alternatively connect the intermediary gearing such that a low speed ratio may be superimposed over an otherwise automatically establishable or established high speed ratio between the driving and driven members at any time without actually shifting gears or dentent character instrumentalities.

A main transmitting shaft 12 extends from pilot journal mounting by means of a bearing 13 carried by the driving member a to pilot journal mounting by means of a bearing 14 carried by the driven member b. This transmitting shaft 12 as a whole forms a direct drive intermediary transmitting member between the driving and driven members a and b. With respect to its forward end portion this main transmitting shaft 12 is adapted to operate as a clutch shaft, or axially aligned intermediate power transmitting member, or input train-to-multi-speed transmitting means, or one of a plurality of concentric members for individual connection to the driving member a, or as a primary driving element to a countershaft driving gear train. With respect to its intermediate portion and in connection with a gear member 15 integral or fixedly but detachably mounted thereon, this shaft 12, and more particularly in combination with its forward portion, is adapted to operate as an automatically connectable driving element of an indirect drive transmitting train between the driving and driven members a and b. And with respect to its rearward end portion this main transmitting shaft 12 is adapted to operate as one speed ratio effected output element or member of a multi-speed intermediary transmitting unit for driving connection with the driven member b, or as the driven end of a direct drive transmitting train, or automatically establishable top speed ratio of drive transmitting train means for connection to drive the axially aligned driven member b.

Axially parallel but out of line with the intermediary main transmitting shaft 12 is a countershaft 16 cluster of rotatably connected or integral gears 17, 18, 19 and 20 and of which the gear 18 mates in constant mesh with the main transmitting shaft fixedly carried gear 15.

A suitable form, combination and arrangement for completing a selective forward or reverse indirect transmitting gear drive means between the main transmitting shaft 12 and driven member b of which the constant meshing gears 15 and 18 and the countershaft 16 are contributory is illustrated consisting of a detachable assembly extension of the driven member b and comprising a rear flanged portion 21 to turn with the shaft portion 22 of driven member b. A forward flange 23 is arranged to turn with the back portion 21 by bolts 24, the latter encompassed by sleeves 25 which serve to space the front and back portions 21 and 23 longitudinally apart while the bolts 24 render the flange 23 revolvable with the driven shaft 22. A member 26 forms an overrunning clutch annulus and is provided with clutch teeth 27. A sleeve 28 freely encircles the rearward portion of the main transmitting shaft 12 and forms one speed ratio of drive output member to drive the driven member b. An overrunning clutch cam hub 29 is carried on and to turn with the sleeve 28 with roller clutch members 30 engaging the cam hub 29 and the annulus 26 providing a one-way drive between the sleeve 28 and driven assembly b. Carried on and to turn with the sleeve 28 is a shiftable gear member 31. A reverse drive idler gear member 32 in constant mesh with the countershaft gear 20 provides an intermeshable selection for the shiftable gear 31 between the countershaft gear 19 for forward gear drive and the reverse idler gear 32 for reverse gear drive. Preferably the sleeve 28 is splined at one diameter as indicated by 33, for inexpensive cost of manufacture, for the full length of its periphery which, with correspondingly splined gear and overrunning clutch cam hub members 31 and 29 affords rotation of the cam 29 with its carrying driving sleeve member 28 and affords rotation of the gear 31 with, but longitudinally shiftable on, its carrying driven sleeve 28. On the shiftable gear 31 for engagement with the clutch teeth 27 on the driven overrunning clutch annulus portion of the driven member assembly b, are mating clutch teeth 34 adapted to be engaged, preferably following the intermeshing of the gear 31 with the reverse idler gear 32, and by which comparatively simple means a reverse drive by-pass around the overrunning clutch between the forward and reverse drive sleeve 28 and the final driven assembly b is obtained. Preferably the periphery of the overrunning clutch annulus 26 is splined as indicated by 35 for the detachable connection of the forward flange portion 23 of the driven assembly b to rotate with the annulus 26. By this simple means longitudinal raceways are by the one stroke of machining obtained for receiving freely rollable instrumentalities such as the anti-friction ball bearing elements 36 shown. Reference to the use for the anti-friction bearing instrumentalities 36 at this point in the structure will be taken up with reference to means for coupling the shaft 12 to drive the driven assembly b to follow. For silent operation in all speeds all gears making up the multi-speed gearset c are of the helical tooth type which reactively under load effect an axial movement urge upon the body of the respective gear member. To render the shiftable gear 31 intermeshable with its selectable gears 19 and 32 the splines 33 between the slidable gear 31 and carrying sleeve 28 must be cut on the same lead as the helix of the teeth of the gear 31. The end movement urge upon the body of the gear 31 under load is thus cancelled out of the gear 31 at the spline relation with its carrying sleeve 28, leaving the latter under end thrust urge to move axially. To prevent any end movement of the gear carrying sleeve 28 I provide a combined radial and end thrust taking bearing 37 between the sleeve 28 and the annulus portion 26 of the driven assembly b. And to shift the gear 31 a bifurcated crank 38 is mounted by means of a transverse shaft 39 in the housing 40 which encases the transmission.

Preferably the housing 40 is formed with an open rear end to which is detachably secured an end wall 41 supporting in turn a rear main transmission bearing 41a preferably of the deep groove ball bearing type and adapted to carry the shaft portion 22 of the driven assembly b and to take any end thrust in the latter particularly that which would be transmitted to the drive assembly b from the sleeve 28 through the intermediary bearing 37. Thus I have described in detail a selective forward or reverse indirect transmitting means for driving the driven member b from the main intermediate transmitting shaft 12 at a different speed than the latter. Which, in connection with means for coupling the intermediate main transmitting shaft 12 to turn with the engine driven driving member a automatically in response to a predetermined speed attainment of the latter would provide an automatic vehicle starting gear drive connection to drive the driven member b in response to the operator accelerating the engine upward from an idling speed.

Assuming the gears 15, 18, 19 and 31 were, respectively, of 21, 25, 18 and 29 teeth this automatic vehicle starting gear drive hereinbefore just described would provide a 2:09 speed reducing ratio sufficient in torque multiplication for most vehicle starting requirements. This automatic vehicle starting speed ratio of drive I choose to term the automatic second speed ratio from which an automatic change to high could advantageously be effected upon a vehicle speed attainment of anywhere from 10 to 20 M. P. H.

To obtain an automatic change to high at, and responsive to, a predetermined speed of rotation attainment by the driven member b corresponding to some vehicle speed within the aforementioned 10-20 M. P. H. range a suitable provision comprises, a longitudinally movable presser clutch member 42 forming the actuating engaging element to a series of frictionally-engaging clutch elements forming the clutch component of a centrifugal automatic clutch mechanism between the main intermediate transmitting shaft 12 and the vehicle propelling driven assembly b. The presser clutch member 42 has an internal frictionally-engaging cone clutch face 43 and a radially extending flange portion 44.

Besides the presser clutch member 42, the frictionally-engaging clutch elements of the centrifugal clutch component e comprise a first bottom friction cone 45, a second bottom friction cone 46, and driving clutch cones 49, 50 and 51 which form an integral driving clutch element 47. This connecting driving clutch cone plurality assembly 47 is in turn carried in rotation with the main intermediate transmitting shaft 12 by means of a hub 53 splined to the shaft 12 and a (preferably spring steel) disk 54 connecting the cone assembly 47 to the hub 53 by means of capscrews 55. Retractive springs 56 are advantageously fit over the spacer and bolt 24 and 25 assemblies between a shoulder 57 provided on the spacers 25 and the back side of the flanged portion 44 of the presser clutch cone member 42. In which positions the springs 56 operate to constantly urge the presser cone 42 forwardly and out of clutch engagement. Centrifugal weights 58 are arranged preferably with their centrifugal weight body surrounding the cone presser clutch member 42 and have feet 59 operatively wedged between the fixed forward flanged portion 23 of the driven member assembly b and the flanged portion 44 of the clutch presser cone member 42, wherein the feet pivot the weights for rock motion in response to rotation of the driven assembly b. It will be seen that while the retractive springs 56 tend to move the presser cone 42 forwardly out of clutch engagement, the action of the centrifugal weights 58 is to urge the presser cone 42 rearwardly into clutching coaction with the driving clutch cone 48, the initial engagement with which latter causes in turn the movement of the entire tri-cone clutch faced driving clutch element rearwardly into engagement with the primary and secondary driven bottom friction clutch cone faces 45 and 46. The plurality of cone clutch engaging units makes for high capacity with low circumferential speeds and particularly advantageously minimizes open clutch clearance requirements, and all tending towards providing a heavy duty centrifugal automatic clutch capable of withstanding successive slip moments under extreme frictional pulls.

The enclosure of this multi-cone clutch in the gear-box subject to the gear lubricant circulated by the running gears lends to the frictionally-engaging clutch cone surfaces receiving considerable lubricant while disengaged for each subsequent engaging slip moment. But to provide the multi-cone clutch frictionally-engaging surfaces with a primary and certain supply of lubricant, reservoired to flow over the various cone clutch surfaces through the disengaged clutch clearances centrifugally, I provide a trap 60 surrounding a journal portion periphery 61 of the shaft portion 22 of the driven assembly b. Which shaft periphery 61 is bled forwardly by a duct or ducts 62 facilitating the flow of lubricant from the trap 60 to within the hollow interior of the cone clutch assembly from where the lubricant is centrifugally urged to distribute over the clutch cones each time they are opened.

To render the singular presser clutch element 42 free to move progressively between initial and positive clutch engagements, I provide longitudinal grooves 63 in the bore of the presser clutch cone 42, corresponding with the splines or grooves 35 in the periphery of the presser clutch member carrying annulus 26. The anti-friction freely rollable instrumentalities 36 are arranged in the grooves 35 and 63 mounting the presser clutch cone 42 positively rotatable with the annulus 26 but free to move longitudinally relatively to the latter. By this novel anti-friction longitudinal movement mounting provision for the presser clutch member 42, and more particularly in connection with its cone form, the presser clutch member 42 is rendered jerk-proof under increasing urge from its centrifugal actuating weights 58 and thereby prevents sticking of the presser clutch member in the process of progressively energizing engagement of the clutch from an initial to a positive state under the gradually increasing pressure from the centrifugal actuating instrumentalities. Thus I have described in detail the improved means of the present transmission invention for automatically establishing the high speed ratio of drive, namely, the connecting of the main intermediate transmitting shaft 12 to drive the driven member. Which driving train I choose to term "fourth" speed ratio.

It will be seen that the automatically establishable top, high or fourth speed ratio of drive to the driven assembly b depends upon the main intermediate shaft 12 as does the indirect gear drive comprising the gears 15, 18, 19 and 31, sleeve 28 and overrunning clutch 30 for driving. This arrangement provides two automatic changing speed ratios of drive to the vehicle propelling driven member b through a single driven connection with the engine driven driving member a, that is to say, when the main intermediate shaft 12 is coupled to the driving member a.

To optionally open the automatic direct drive and revert the transmission to a high ratio gear drive through gears 65, 17 18 and 15, or to optionally alter the automatic gear drive of gears 15, 18, 19 and 31 to the still lower gear ratio of gears 65, 17, 19 and 31, I provide a sleeve shaft 64 in encircling and rotatable relative relation to the forward portion of the main intermediate shaft 12, which sleeve shaft 64 is adapted to operate as a secondary input-to-change speed gearset driving element, or as a plurality concentric clutch or intermediate transmitting shaft element to the main intermediate or clutch shaft 12, or as a driving element to an auxiliary gear drive transmitting train component of the multispeed transmitting unit c. With this forward sleeve shaft 64 is (preferably integral) a gear member 65 constantly meshing with the countershaft gear 17 and thus providing an auxiliary or optional gear drive, or indirect driving transmitting train in permanent connection to drive both the high speed main intermediate shaft 12 through the gears 18 and 15 and the low speed driven member driving train of gears 19, 31, sleeve 28 and overrunning clutch 30. This primary gear driving train consisting of the forward sleeve shaft 64 and gears 65 and 17 is normally adapted to run idle, but for optional primary driven connection with the engine driven driving member a. It will be seen that if the gears 65 and 17 are, respectively, of 16 and 28 teeth their drive augmentative to the pair of gears 18 and 15, respectively, having 25 and 21 teeth, provides a 1:47 speed reducing ratio of drive to the main intermediate shaft 12 which, if the latter were in direct connection with the driven member b would give the latter a forced or optional "third" speed ratio of drive of 1:47 to 1. And the optional gear train of gears 65 and 17 augmentatively to the gears 19 and 31, the latter respectively, having 18 and 29 teeth, and when carrying the load of the driven member b, would give the latter a forced or optional first speed ratio of drive of 2:82 to 1. Thus I have disclosed two automatically establishable speed ratios of drive between the driving and driven members a and b, respectively, of 2:09 to 1 and 1 to 1, and two forced or optional speed ratios of drive obtainable, respectively, a 1:47 to 1 optional alternative to the 1 to 1 automatic ratio and a 2:82 to 1 optional alternative to the automatic 2:09 to 1 ratio.

It will be seen at this point that should the auxiliary or optional gear train of gears 65 and 17 be brought in play to drive the countershaft for starting the driven member b from a state of rest, that until the centrifugal clutch 42 coupled the main intermediate shaft 12 to the driven member b, the drive would be through gears 65 and 17, countershaft 16 and gears 19 and 31 of the 2:82 to 1 ratio (first or low); that with the driving through the auxiliary or optional gear train of gears 65 and 17 maintained and the engagement of the automatic clutch between the main intermediate shaft 12 and driven member b taking place automatically in response to predetermined speed attainment by the driven member b, the drive would automatically change to gears 65 and 17 and gears 18 and 15 and thence through the main intermediate shaft 12 and engaged cone clutch 42 to the driven member b at 1:47 to 1 ratio (third); and that by thereafter optionally relinquishing the drive through the optional gears 65 and 17 and alternatively effecting a direct drive couple between the main intermediate shaft 12 and driving member a, the ratio of drive to the driven member b would change to 1 to 1. Thus I have described a transmission constructed in accordance with my present invention as affording three successive speed ratios, for example, of 2:82 to 1—1:47 to 1 and 1 to 1 if the use of the optional train of gears 65 and 17 are persisted in until after the vehicle has attained the predetermined speed and the centrifugal automatic clutch responsive to the speed of the driven member b has engaged.

It is of importance and interesting to note that the same three pairs of constant meshing gears employed will provide successive three speeds pick-up of the load of the driven member b from a state of rest if the use of the optional gear train of gears 65 and 17 is relinquished before the vehicle has reached an accelerated speed attainment sufficient to cause engagement of the automatic driven member speed responsive automatic clutch e, as follows: With the drive initially through the gears 65 and 17 and gears 19 and 31 the same 2:82 to 1 starting speed is obtained, but by relinquishing the gear drive through gears 65 and 17 and permitting the alternative direct drive couple to come into play between the main intermediate shaft 12 and driving member a, before the centrifugal automatic clutching at e takes place, the drive changes to gears 15 and 18 and 19 and 31 giving a 2:09 to 1 ratio and the change to 1 to 1 upon the centrifugal automatic clutching at e taking place. Thus obtaining the successive speed ratios of 2:82 to 1—2:09 to 1 and 1 to 1 as against 2:82 to 1—1:47 to 1 and 1 to 1. To this extensive variable speed ratio control attainment from three constant meshing pairs of gears and a direct drive shaft line, add the optional "forced third" under-gear-ratio of 1:47 to 1 alternative to "fourth" (high) through the optional employment of gears 65 and 17 to drive gears 18 and 15; and the optional "forced first" (low) under gear ratio of 2:82 to 1 alternative to automatic "second 2:09 to 1 ratio" through the optional employment of gears 65 and 17 to drive gears 19 and 31, all without a shift between clashable dentate positive clutch or gear forms, but rather by alternate use of friction clutches, and the unusual range, utility and flexibility from the simplest form of gearing becomes apparent.

*Optional change speed control.*—For the normal automatic establishment of direct drive couple between the main intermediate shaft 12 and driving member a a novel and simplest form of centrifugal automatic clutch mechanism is illustrated comprising the flat bottom friction clutch face 66 on the rear side of the engine flywheel 11. A clutch or driven disk 67 carries the usual friction facing 68 and is engaged between the rear face 66 of the flywheel 11 and a presser plate 69 within the clutch housing 70, the clutch disk serving to drive or directly couple the main intermediate shaft 12 to the driving member a when clamped between the presser plate 69 and the flywheel 11. In the conventional clutch the presser plate 69 would normally be advanced toward the flywheel 11 by spring pressure so that the clutch would be engaged at all times unless manually retracted. In the illustrated clutch in this particular adaptation the presser plate 69 is normally retracted away from the flywheel 11, and is only advanced toward the flywheel 11 into engagement with the driven disk 67 when the engine driven driving member a reaches a predetermined speed sufficient to energize the centrifugally operated mechanism to be hereinafter described. A subclutch housing 71 is secured to the main clutch housing 70 and extends first preferably divergingly from the outer rim rearwardly and inwardly to a point at which a back plate 72 of heavier section is preferably secured thereto. Preferably radial openings 73 are provided in the subhousing 71 and accommodate rim projections 74 of the presser plate 69 connecting the latter to rotate with the clutch housing 70, which latter in turn being detachably secured by means of capscrews 75 to the flywheel 11 brings the presser plate 69 into connection to rotate with the driving member a. The presser plate 69 by this simple form of mounting to rotate with the flywheel carried clutch shell or housing is rendered free to move longitudinally. Preferably the presser plate 69 is formed with a rearwardly extending cylindrical central portion providing an inner flange portion in close proximity to the back plate 72, into which latter are threaded capscrews 76 having stepped diameters, freely passing through the presser plate 69 and compressing retractive springs 77 between the head of the capscrews 76 and the forward side of the presser plate 69. This arrangement of the retractive springs 77 suffices to cause the presser plate 69 to be constantly urged away from its associate engageable clutch disk 67 while energizing the presser plate 69 to normally sustain the feet 78 of centrifugal weights 79 vertically between the presser plate 69 and back plate 72. It will be noted that the centrifugal weights 79 are inverted and offset forwardly with respect to their pivoted feet 78 by which the weights rock or swing rearwardly under rotation, press the presser plate 69 forwardly and facilitate optional disengagement of the presser plate 69 from the disk 67 by means thrust against the outer ends of the weights from the rear or right. This arrangement of the centrifugal weights 79 eliminates the usual clutch release levers, and due to the adaptation of the weights to be optionally moved slightly forwardly from their rearwardly centrifugally advanced position around the axis of their feet to accomplish optional release of the centrifugally engaged clutch unit, together with the arrangement facilitating the effort to optionally retract the weights being exerted upon the extreme leverage outer ends of the weights, affords their easy retractive motivation. Thus I have described the automatic engaging clutch unit of the multi-input clutch mechanism d which has as its respective function the individual coupling of the main transmitting shaft 12 to the driving member a. Coupling of the auxiliary gear train driving shaft 64 to the driving member a is brought under the function of the multi-input clutch mechanism provision d, of which, a novel optionally engageable clutch unit is illustrated and described as follows:

The clutch housing or outer shell portion 70 thereof is formed to extend preferably in full diameter to a point slightly flanged at right angles inwardly. Within this portion of the clutch shell 70 are lugs 80 secured to the shell, and carried in the shell rotatable therewith but longitudinally movable relatively thereto by means of the lugs 80, is an engageable driving clutch cone 81. The inner flanged ends of the shell 70 serve as a rearward movement stop and the centrifugal weights 79 serve as a forward movement stop for the driving clutch cone 81, which relation of the centrifugal weights 79 to the driving clutch cone 81 is permissible by virtue of both rotating as part of the driving clutch unit. Thus the centrifugal weights 79 serve as a bottom pressure taking element to the driving clutch cone 81 and the driving clutch cone is rendered operative as a bottom friction clutch element operative under pressure of engagement from the rear to contact the centrifugal weights at their extreme outer ends and subsequently urge same to swing or move in rock motion forwardly at their thusly contacted outer ends. The result being release, or prevention of clutching of the clutch disk 67 as a reaction to cone clutch engaged pressure from the rear, since the retractive springs 77 exert a constant urge upon the presser plate 69 to back away from the clutch disk 67, which urge becomes effective upon any forward retractive swing or rock movement on the part of the centrifugal weights 79.

Normally disengaged, but for optional forward movement into engagement with the bottom friction driving clutch cone 81, is a driven clutch cone 82 serving to drive the outer shaft 64 when brought up to sufficiently energized engagement with the driving clutch cone 81.

The centrifugal weights 79 are adapted to be contacted at their outer ends from the rear and forced forwardly to force disengagement of the front centrifugal clutch. This will amount to rotating the centrifugal around its own axis rather than requiring that the centrifugal force be completely overcome to accomplish disengagement of the automatic clutch at speeds at which the centrifugal would normally be effective to cause engagement of the clutch. The length ratio of the body weight proper of the centrifugal weight 79 over the length of its foot 78 provides the usual leverage ratio of the conventional clutch "throwout" fingers. The optionally engaged clutch cones 81 and 82 operate as an actuator to these centrifugal weights (clutch throwout fingers) for forcing the latter to rock forwardly against their centrifugal tendency to rock rearwardly. The bottom cone clutch element 81 is mounted for free longitudinal movement for this purpose. The engaging mate (driven) cone 82 operating to push the bottom cone 81 against the centrifugal weights 79. Thus by forcing the driven cone 82 into engagement with the cone 81 through the medium of the clutch actuating bearing 93 the optional change speed cone clutch is closed and the centrifugal automatic clutch is forced open. The input to the gearset may thusly be alternated at the will of the operator between shafts 12 and 64. The leverage of the centrifugal weights 79 provides a higher coefficient of disengaging rate to the centrifugal clutch than the coefficient of clutch engagement build up in the actuating cone clutch. This differential of clutching coefficients as between one clutch by its engagement forcing another clutch out of engagement provides a compensation for the differential of gear ratios effected. It will be seen that torque will be transmitted through the actuating cone clutch unit before it fully accomplishes its superimposing function of forcing disengagement of the centrifugal clutch. It is a further object of the present invention therefore to provide a hub 83 secured to the engaging driven clutch cone 82 and provided with longitudinal grooves 84 in its bore; to spline the respective carrying or driven shaft 64 as indicated at 85 thus providing corresponding longitudinal grooves on the periphery of the shaft 64; and to fit, preferably, balls 86 in the corresponding grooves thus providing means positively preventing relative rotation but facilitating free longitudinal movement of the hub 83 and secured clutch cone 82 relatively along the axis of its carrying shaft 64. A snap ring 87 in the periphery of the shaft 64 operates to limit the travel of the balls 86 rearwardly thus establishing the maximum normally disengaged separation of the driven cone 82 from the driving cone 81. A snap ring 88 in the end periphery of the shaft 64 coacts with a ring 89 having stepped diameters and operating as a forward end abutment for a retractive spring 90 which in turn is compressed against the forward end of the hub 83 of the driven clutch cone 82 thus providing a resilient means constantly but yieldingly urging the driven clutch cone or engagement optional clutch member 82 out of engagement with its mating driving clutch cone 81. And forming an end retainer for the balls 86 is a snap ring 100 fitted in the forward end bore of the hub 83. Altogether this makes for a novel simple, effective and rugged mounting facilitating free axial movement for the engaging element of the optional change speed clutch component of the present invention.

The usual clutch throw-out-bearing-carriage spindle 91 supports the usual carriage 92 carrying the optional clutch actuating bearing 93. In the conventional clutch the optional clutch actuating bearing 93 would be coactive with the usual clutch throw-out fingers (not shown) but substituted for by the centrifugal weights 79.

The usual retractive spring 94 operates to normally hold the optional control clutch bearing 93 out of engagement with the actuatable driven clutch element 82. While the usual bifurcated crank 95 carried on the usual shaft 96 is provided forming the final element of linkage (not shown) bringing the bearing 93 under control of the operator to be optionally actuated.

A bearing (suitably a needle type) 97 sustains the forward end of the sleeve shaft 64 on its spindle related main intermediate shaft 12, while a combined radial load and end thrust taking bearing 98 (preferably tapered roller type) serves to journal the main intermediate shaft 12 in the end of the sleeve shaft 64, and a bearing 99 provides for anti-friction end thrust of the intermediate shaft 12 and carried gear 15 rearwardly against the driven sleeve 28 from which latter said rearward end thrust is taken by the bearing 37. The usual main transmission bearing 100 journals the outer of the two concentric clutch shafts 64 in the usual forward wall of the gearbox 40.

The operation of the invention follows:

*Optional three speed start-to-top acceleration of the vehicle.*—Assuming the shiftable gear 31 is positioned forwardly in mesh with the countershaft forward drive gear 19 (placing the transmission in all forward speeds gear) the driver conventionally accelerates the engine with the right foot and depresses the conventional clutch pedal (not shown) with the left, resulting in the crank 91 being swung forwardly, engaging the optional clutch driven cone 82, pressing the latter into engagement with the bottom friction driving cone 81, forcing the latter into engagement with the outer end of the centrifugal weights 79 (serving as clutch release fingers), forcing the latter into their normal positions of rest non-responsive to their centrifugal movements tendencies, and normalizing the presser plate 69 to be maintained out of engagement with the clutch disk 67. Whereby the drive connection initially with the engine is effected through the optionally engageable clutch cones 81 and 82, the auxiliary sleeve shaft 64, the auxiliary gearing drive augmentative train of gears 65 and 17, the countershaft, the forward drive preselection of gears 19 and 31, the gearing or indirect driven output sleeve 28, the overrunning clutch 30, and thence through the vehicle propelling driven member b ensemble comprising drivingly in order the flange 23, the bolts 24, the flange 21 and the final output tail-shaft portion 22. This ratio being 2:82 to 1 from a given set of gears constituting the multi-speed gearset c or first (low) speed ratio being maintained up to a predetermined vehicle speed, whereupon: Automatic change from first to second (under optional control) maintaining the depressed clutch pedal (not shown) with the left foot and maintaining engine acceleration in the usual manner with the right foot continues the operation of the described first speed up to a predetermined vehicle accelerated speed attainment of said 15 M. P. H., at which point the centrifugal weights 58 actuate the presser cone 42 of the driven member b centrifugal automatic clutch component of clutch mechanism e to clamp the driving plurality of clutch cones 49, 50 and 51 to driven cones 43, 45 and 46, whereby the intermediate shaft 12 becomes connected directly to the driven member b, the gear driving train of gears 19 and 31 and output sleeve shaft 28 and overrunning clutch relinquishing the drive to the higher speed ratio direct drive. Resulting in the gear drive changing from gears 65 and 17 and gears 19 and 31 to gears 65 and 17 and intermediate gears 18 and 15 resulting in an automatic change in gear drive from 2:82 to 1 to 1:47 to 1, for example.

*Optional high speed accelerating second.*—Maintaining of the depressed clutch pedal (not shown) while maintaining engine acceleration conventionally with the right foot maintains the thusly automatically established second speed ratio of 1:47 to 1 alternative-to-the first (low) speed 2:82 ratio up to any desired vehicle speed attainment under this fast second speed ratio at which change to fourth (high) is establishable, while still maintaining a fully accelerating engine if desired, by simply removing the left foot from the clutch pedal. The result of the latter being the release of the optional clutch cones 81 and 82, the subsequent release of the centrifugal weights 79 and their subsequent centrifugal normal action to actuate the presser plate 69 to clamp the clutch disk 67 between the presser plate 69 and flywheel 11. Whereby the gear drive by shaft 64, gears 65 and 17 and gears 18 and 15 is relinquished to the direct drive coupling between the main intermediate shaft 12 and driving member a by virtue of the driving member centrifugal automatic clutch mechanism being released to function normally. The drive is now direct (fourth) solely through the medium of the main intermediate shaft 12. Thus I have described the optional availability of three speed get-away from a standing start with automatic change to second at a predetermined vehicle speed attainment and continued acceleration in the fast second to any desired vehicle speed attainment before optional change to high (fourth).

*Optional third speed alternative-to-fourth.*—At any vehicle speed above, in the way of example, 15 M. P. H., and at which the transmission is automatically established by means of one or more of the centrifugal automatic clutches in a given speed ratio, the driver may alter the transmission to operate at the next-in-ratio lower speed by maintaining the accelerator fully depressed with his right foot and in the fool-proof manner, thrust the clutch pedal (not shown) down with his left foot. This will result in the optional clutch cones 82 and 81 being brought into engagement initially with low pressure clutching coefficiency frictionally until the thusly engaged unity of cones 81 and 82 reach the centrifugal weights (clutch release fingers) 79 and subsequently force the latter to swing forwardly counter to their normal centrifugal swing effect obtaining subsequently the release of the clutch disk 67 and thus finally, against counteracted centrifugal weights (clutch release fingers) 79, build up maximum pressure engagement of the cones 81 and 82. Whereby the high (fourth) speed drive is optionally broken as between the driving member a and the main intermediate shaft 12, and the substitute drive of shaft 64 and gears 65 and 17 and gears 18 and 15 is brought into connection, through the medium of the optionally engaged cones 81 and 82, with the power driving member a. This optional "forced" third speed ratio 1:47 to 1 obviously is maintainable as long as desired by maintaining the clutch pedal (not shown) depressed. Any suitable form of easily releasable catch or ratchet means could be provided if desired whereby, once depressed the clutch pedal control of the optionally engageable speed changing clutch unit would remain engaged until tripped into release again. As for example would be a requirement in negotiating long grades in "forced" third speed.

A virtue of the novel provisions and relations between the intercontrol connected centrifugal automatic and the optionally engageable clutch units, is that the torque-flow may be maintained through the speed ratio to be supplanted under maintained full engine acceleration while the supplanting relatively lower speed ratio of drive is brought into play to take the load. This, by virtue of the optional clutch forming an intermediary in the optional means for releasing the automatic engaging clutch unit compensates for the differential between speed ratios of the thusly optionally supplanted and supplanting drives.

Likewise, with respect to the optional "forced" third speed alternative to the automatically established fourth (high), optional "forced" first (low) is obtainable as an alternative to automatic second under the vehicle speed of 15 M. P. H., for example, at which the automatic second would normally be operating.

*Optional differential of stepped acceleration three speed ratios.*—As the optional three speed getaway is effected as hereinbefore described (at the start of the description of operation), but with the exception that the optional control clutch pedal (not shown) is released prior to the vehicle attaining the 15 M. P. H. at which the rear or driven member centrifugal clutch engagement takes place, the differential stepped relation of optional three speed getaway from a standing start would be, first (low) 2:82 to 1, clutch pedal release of optional first below 15 M. P. H. resulting in change to automatic second 2:09 to 1 and thereafter upon 15 M. P. H. vehicle speed attainment the automatic change to fourth (high) 1 to 1 ratio.

*Wholly automatic two-speed.*—By simply accelerating the engine for a vehicle start the centrifugal weights 79, being normally free to swing centrifugally, will cause the engagement of the clutch disk 67, subsequently the initial automatic starting second speed ratio drive of 2:09 to 1 through shaft 12 to gears 15 and 18, thence through gears 19 and 31 and thence through sleeve 28 and overrunning clutch 30 to the driven member b embodiment of flange 23, bolts 24, flange 21 and output shaft portion 22. And upon 15 M. P. H. vehicle accelerating speed attainment the centrifugal weights 58 will cause the closing of the normally open clutch unit of driven cones 43, 45 and 46 with driving cones 49, 50 and 51 causing the main intermediate shaft 12 to directly take the load of the driven member b, thus automatically changing to fourth (high). This change also is obtainable under fully maintained engine acceleration and no interruption of vehicle propelling torque flow, which is generally preferred over the torque reactive principle which imposes that the engine be decelerated and a wait occasioned before reaccelerating in order to effect the change.

*Reverse.*—Preferably dash control shift of the gear 31 rearwardly into both gear tooth mesh with the reverse idler gear member 32 and into clutch tooth mesh of dentates 34 and 27 establishes the transmission in reverse gear drive. The reverse gear ratios obtainable thereafter are optional first (low reverse) by depressing the clutch pedal (not shown) and subsequently bringing the drive in from the driving member a through the optional clutch elements 81 and 82, shaft 64 and gears 65 and 17 to gears 20, 32 and 31, or automatic second (reverse) by simply accelerating the engine whereby the drive is brought in from the driving member a through the main transmitting shaft A and gears 15 and 18 to gears 20, 32 and 31.

Neutral is obtainable for warming up or racing the engine without propelling the vehicle, by shifting the gear 31 intermediate between forward gear drive and reverse gear drive gears 19 and 32.

Thus I have described a simplest form of automatic change speed transmission, while embodying numerous novel component constructions and interclutch control and drivingly operating relations between different speed ratio effective trains, and affording both automatic and optional change speed control at most advantageous points of vehicle speed, which is kept down to the time proven rugged and least expensive wheel type of gears and fixed-axis torque-multipling countershaft component, and employing the least number of gears in substantially the same arrangement as in the least expensive of manually shifted current conventional three speed forward and reverse motor vehicle transmissions.

It will be understood that numerous details of construction may be varied through a wide range without departing from the spirit and principles of the invention, and I, therefore, do not purpose limiting the patent granted thereon otherwise than necessitated by the prior art.

I claim:

1. In a power transmitting mechanism, a pair of concentric driving members, a common driven member in axial alignment therewith, a parallel countershaft, a forward drive gear on said countershaft, a reverse drive gear train driven from said countershaft and including a selective intermeshable gear member parallel but out-of-line with said countershaft and spaced longitudinally with respect to said forward drive gear, a longitudinally shiftable driven gear splined on the outer one of said pair of concentric driving members and adapted to be shifted oppositely into mesh, respectively, with said forward drive gear and said selective intermeshable gear of said reverse drive train, an overruning clutch one-way drive connecting said outer of said pair of concentric members with said driven member, said longitudinally shiftable driven gear and said driven member each having parts engageable to positively prevent relative rotation therebetween upon the intermeshing of said shiftable gear with the said selective intermeshable gear member of said reverse drive train, and a friction type automatic engaging clutch mechanism operatively disposed between the inner one of said pair of concentric driving members and said driven member and adapted to couple said inner concentric driving member and said driven member to turn together in either direction.

2. In a power transmitting mechanism, the combination of a pair of concentric driving members, a common driven member in axial alignment therewith, a parallel countershaft, selective means for either forward gear driving or reverse gear driving the outer one of said pair of concentric driving members from said countershaft including a driven gear splined directly on said outer one of said pair of concentric driving members for longitudinal shifting thereon such as for alternative mesh with optional intermeshable gear members, said outer one of said pair of concentric driving members forming a driver for said common driven member a one-way clutch actuated by said outer one of said pair of concentric members and operating to drive said driven member, said driven member having a shaft portion coming into axial-line contiguity with the driving end of the inner one of said pair of concentric members and an enlarged hollow portion telescoping the driving end of the outer one of said pair of concentric members, a centrifugal automatic clutch mechanism having its driving element carried in rotation with and on the inner one of said pair of concentric members longitudinally intermediately between the contiguous driving end of the outer one of said pair of concentric members and the shaft portion of said driven member, said friction clutch having its driven element carried in rotation with said driven member and said driving and driven elements comprising a plurality of frictionally-engaging units of mate cone-shaped friction clutch members.

3. In a power transmitting mechanism, the combination with a driven member and a pair of concentric driving shafts each forming a different speed ratio of drive and adapted individually connectable to drive said driven member; of a longitudinally grooved hub connected to turn at least in one direction with the outer one of said concentric members, a presser friction clutch member having a correspondingly longitudinally grooved portion in surrounding relation to said grooved hub and roll free instrumentalities fitted in said grooves of both said hub and said presser clutch member forming means connecting the latter to rotate with said hub but facilitating easy longitudinal movement of said clutch presser member relative to said hub; a bottom friction clutch member connected to turn with said driven member, a driving friction clutch member between said presser clutch member and said bottom friction clutch member, said driving clutch member carried in rotation with the inner one of said pair of concentric driving shafts, resilient means for moving said presser clutch member away from said driving clutch member under certain conditions, and automatic means for moving said presser clutch member toward and into engagement with said driving clutch member whereby the latter will be pressed into engagement with said bottom friction clutch member.

4. In a power transmitting mechanism, the combination with a driven member and a plurality of different speed ratio concentric driving members in axial alignment therewith and each for individual coupling to drive said driven member; of means for coupling at least one of said plurality of concentric driving members to said driven member including a friction type centrifugal automatic clutch, said clutch comprising a back wall fixed to said driven member, a longitudinally spaced front wall, a presser clutch member having an internal clutch cone portion opening outwardly with increasing diameter rearwardly and an outwardly extending flange portion adjacent said front wall, centrifugal weights arranged with their weight body disposed around the cone portion of said presser member, said centrifugal weights having wedging feet portions pivoted operatively between said front wall and the thereadjacent said flange portion of said presser member for clutch engageably actuating the latter toward said back wall, duplex bottom friction clutch cones extending forwardly from said back wall one within the other, the outer of said bottom cones diverging inwardly forwardly and the inner bottom cone diverging outwardly forwardly, said duplex bottom friction clutch cones being fixed to said back wall, a multi-cone clutch faced driving clutch member carried in rotation with said one of said plurality of concentric driving members, said driving clutch member having a frictionally-engaging cone portion disposed between the internal cone clutch face of said presser clutch member and the external one of the said duplex bottom friction clutch cones and adapted to be clutched therebetween, said driving clutch member having another frictionally-engaging cone portion disposed within and for engagement with the internal one of said duplex bottom friction clutch cones, means connecting said front and back walls in fixed longitudinally spaced relation and to form a revolvable unity, and means including resilient devices for yieldingly urging said presser clutch member to move forwardly out of clutch engagement.

5. In combination with power transmitting mechanism including driving and driven members and intermediary transmitting members forming means for driving said driven member from said driving member at one speed ratio with a speed responsive automatic clutch mechanism carried by one of said driving, driven and intermediary transmitting means members for completing the driving connections of said one speed ratio between said driving and driven members; of a frictionally-engaging presser clutch member for connection to rotate with, but for longitudinal movement relative to, the said member carrying the said clutch mechanism, and automatic means operable in accordance with increasing speed of rotation of said presser clutch member to movably energize the latter to frictionally establish said clutch mechanism in engagement; means including corresponding longitudinal raceways on each of the said presser clutch member and the said clutch carrying member and freely rollable instrumentalities engaging said raceways of both said presser clutch and said carrying members forming means positively preventing relative rotation therebetween but facilitating free longitudinal movement of said presser clutch relative to said carrying member smoothly in exactness of response and in accordance with the gradually increasing energizing effort of said speed responsive means whereby said clutch mechanism is engageably rendered jerkproof throughout its engaging range from initial to positive engagement.

6. In a motor vehicle drive, the combination with the flywheel of the vehicle engine; of variable speed power transmitting mechanism including two clutch shafts each controlling a different speed ratio of said variable speed mechanism and each clutch shaft for connection to turn with said flywheel; a first clutch mechanism for connecting one of said clutch shafts to said flywheel, said first clutch mechanism provided with automatic means for engaging same, said first clutch mechanism provided with an element fulcrumed for motion and whereby actuating effort applied to one portion of said element will be multiplied and operative at another portion of said element to actuate said first clutch non-engageable; and a second clutch mechanism for connecting the other of said clutch shafts to said flywheel, said second clutch mechanism having a bottom friction clutch element adapted to be thrust into engagement with, and to actuate, said fulcrum mounted element of said first clutch mechanism to cause said rendering of said first clutch non-engageable as a reaction to engagement of said second clutch mechanism.

7. In a power transmitting mechanism, the combination with a variable speed power transmitting mechanism; of two clutch shafts one associated with one speed ratio and another associated with another speed ratio of said variable speed mechanism, a power transmitting member for connection to turn with either of said clutch shafts, a first clutch mechanism for connecting one of said clutch shafts to turn with said transmitting member, a second clutch mechanism for connecting the other of said clutch shafts to turn with said transmitting member, automatic means for engaging one of said clutch mechanisms, means for engaging the other clutch mechanism, means including the engaging clutch element embodiment of said other clutch mechanism being movable under engagement energizing to form means for disengaging said automatic engaging clutch mechanism and coacting means intercontrol relating said automatic engaging and said movable clutch engaging element embodiment of said other clutch mechanisms whereby said automatic engaging clutch is actuated to disengage reactively to progressively energized engagement of said other clutch mechanism, and means including a hub portion of the clutch shaft associated element of said other clutch mechanism and anti-friction bearing instrumentalities connecting said hub portion to said associate clutch shaft whereby said associate clutch element and clutch shaft are connected to turn together but permitting free axial movement of said clutch element relative to its associate clutch shaft so as to render the said movable engaging clutch element embodiment of said other clutch mechanism free to move axially for the complete disengagement of said automatic engaging clutch while torque is being transmitted between said engaging clutch element embodiment and its associate clutch shaft.

8. In a motor vehicle power drive, the combination with the engine flywheel and the change speed gearset of said drive; of a plurality of clutch shafts for individual coupling to turn with said flywheel and each associated with a different speed ratio of said change speed gearset; an automatic engaging friction clutch mechanism carried in rotation with and by said flywheel and including a driven clutchable element to drive at least one of said plurality of clutch shafts; actuating force multiplying levers associated with said clutch and adapted to be engaged by a force imparting medium to cause disengagement of said clutch; an optionally-engageable friction clutch unit between another of said plurality of clutch shafts and said flywheel, said optionally-engageable clutch unit comprising drive and driven frictionally-engaging elements adapted to move axially as a body reactively to the pressure of their being engaged; means for applying said optional-clutch-engaging-body movement to said disengaging levers of said automatic-engaging-clutch mechanism; and means for engaging and disengaging said drive and driven friction elements of said optionally-engageable clutch unit.

9. In a power transmitting mechanism, the combination with one power transmitting member and a plurality of other power transmitting members each for connection to turn with said one power transmitting member; of an automatic engaging clutch mechanism between at least one of said plurality of other transmitting members and said one member for causing the respective said connection therebetween; another clutch mechanism between another of said plurality of other transmitting members and said one member for causing the respective said connection therebetween, one element of said other clutch mechanism in connection to turn with one of the respective connectable said members and the other element of said other clutch mechanism for connection to turn with, but for axial movement relative to, the other of the respective connectable said members, means including anti-friction bearing instrumentalities forming a non-relatively rotatable connection between said axial movement adapted one of said clutch elements and its respective associate power transmitting member, resilient means urging said axial movement adapted one of said clutch elements in one axial direction to normally disengage said clutch elements, means for forcing said axially movable clutch element in the other direction against restraint of said resilient means to effect engagement of said clutch elements; and means whereby said automatic engaging clutch mechanism is caused to disengage or prevented from engaging in response to engagement of said other clutch mechanism.

EVERETT R. BURTNETT.